United States Patent
Jonouchi et al.

(10) Patent No.: US 8,539,756 B2
(45) Date of Patent: Sep. 24, 2013

(54) EXHAUST PURIFICATION DEVICE FOR INTERNAL COMBUSTION ENGINE

(75) Inventors: Katsunari Jonouchi, Osaka (JP); Michihiko Hara, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 130 days.

(21) Appl. No.: 13/257,175

(22) PCT Filed: Mar. 11, 2010

(86) PCT No.: PCT/JP2010/054097
§ 371 (c)(1),
(2), (4) Date: Sep. 16, 2011

(87) PCT Pub. No.: WO2010/106959
PCT Pub. Date: Sep. 23, 2010

(65) Prior Publication Data
US 2012/0006009 A1   Jan. 12, 2012

(30) Foreign Application Priority Data

Mar. 19, 2009   (JP) .................................. 2009-068323

(51) Int. Cl.
*F01N 3/00*   (2006.01)
*F01N 3/02*   (2006.01)

(52) U.S. Cl.
USPC .................................. 60/277; 60/295; 60/311

(58) Field of Classification Search
USPC .................... 60/277, 295, 297, 311
See application file for complete search history.

(56) References Cited

U.S. PATENT DOCUMENTS
7,404,291 B2   7/2008   Endo

2010/0018186 A1   1/2010   Shibata et al.

FOREIGN PATENT DOCUMENTS

| EP | 1 602 806 A1 | 12/2005 |
|---|---|---|
| EP | 1650414 A1 * | 4/2006 |
| JP | 2003-155912 | 5/2003 |
| JP | 2003-155920 | 5/2003 |
| JP | 2004-68734 | 3/2004 |
| JP | 2005-163652 | 6/2005 |
| JP | 4033189 B | 11/2007 |
| JP | 2007-327392 | 12/2007 |
| JP | 4033189 | 1/2008 |

OTHER PUBLICATIONS

International Search Report for PCT/2010/05407, mailed Jun. 1, 2010, 2 pages.
Notice of Reasons for Refusal for Japanese Patent Application No. 2009-068323, Japanese Patent Office, mailed May 14, 2013, 10 pages (with English troatslation).

* cited by examiner

*Primary Examiner* — Kenneth Bomberg
*Assistant Examiner* — Audrey K Bradley
(74) *Attorney, Agent, or Firm* — Sterne, Kessler, Goldstein & Fox P.L.L.C.

(57) ABSTRACT

Provided is an exhaust purification device for an internal combustion engine, wherein the operation of an internal combustion engine can be prevented from being maintained when a particulate filter is melted. An exhaust purification device is comprised of a particulate filter; a downstream-side temperature sensor which detects a downstream-side exhaust temperature; a filter temperature sensor which detects a filter temperature; an exhaust differential pressure detection device which calculates an exhaust differential pressure between an upstream-side exhaust pressure and a downstream-side exhaust pressure at predetermined time intervals; a notification device; and an ECU which controls the internal combustion engine based on a differential pressure variation first and second exhaust differential pressures or the downstream-side exhaust temperature.

4 Claims, 2 Drawing Sheets

EXHAUST PURIFICATION DEVICE FOR INTERNAL COMBUSTION ENGINE

TECHNICAL FIELD

The present invention relates to an exhaust purification device for an internal combustion engine. In more detail, the present invention relates to an art for preventing melt damage of an exhaust purification device for an internal combustion engine.

BACKGROUND ART

Conventionally, as an art for collecting particulate in exhaust gas discharged from an internal combustion engine, an art is known in which an exhaust purification device for an internal combustion engine having a particulate filter in an exhaust route. The particulate filter has honeycomb structure constructed by a porous wall of ceramic or the like, and the exhaust gas is always discharged to the downstream side after passing through the porous wall. An art is well known in which the particulate is burnt and removed which is accumulated in the porous wall when the exhaust gas passes through the porous wall. However, the rotational speed of the internal combustion engine so as to reduce the flow rate of the exhaust gas, and the cooling of the particulate filter by the exhaust gas becomes insufficient. When load on the internal combustion engine is reduced so as to increase residual oxygen amount, excess combustion by the residual oxygen is apt to occur. Therefore, there is a problem in that the possibility of melt damage of the particulate filter is increased.

Then, an art is well known in which the driving state of the internal combustion engine and the temperature of the particulate filter are detected and the reduction of the exhaust flow rate is suppressed so as to prevent the melt damage of the particulate filter. An example of the art is shown in Patent Literature 1.

However, even if the control mentioned above is performed, it is difficult to prevent perfectly the melt damage of the particulate filter. Furthermore, there is a problem in that when the driving of the internal combustion engine is continued while the melt damage of the particulate filter exists, injurious materials such as the particulate included in the exhaust gas are not collected and discharged to the open air.

Patent Literatures

Patent Literature 1: the Japanese Patent No. 4033189

DISCLOSURE OF INVENTION

Problems to be Solved by the Invention

The present invention is provided in consideration of the problems, and the purpose of the present invention is to provide an exhaust purification device for an internal combustion engine which can prevent the driving of the internal combustion engine from being continued while the melt damage of the particulate filter exists.

Means for Solving the Problems

The above-mentioned problems are solved by the following means of the present invention.

According to the present invention, an exhaust purification device for an internal combustion engine includes a particulate filter, an exhaust temperature detection means detecting a downstream-side exhaust temperature of the particulate filter, an exhaust differential pressure detection means calculating a differential pressure between an upstream-side exhaust pressure of the particulate filter and a downstream-side exhaust pressure of the particulate filter at every predetermined time, a notification means performing notification based on the state of the particulate filter, and a control means controlling the internal combustion engine. The control means is connected to the exhaust temperature detection means, the exhaust differential pressure detection means and the notification means, and the control means calculates a differential pressure variation based on a first differential pressure and a second differential pressure detected after the predetermined time, and when the differential pressure variation is not less than a reference variation, or when the downstream-side exhaust temperature is not less than a reference temperature all the reference time and more, the control means notifies the request of stop of the driving of the internal combustion engine by the notification means or stops the driving of the internal combustion engine.

According to the present invention, the control means notifies the request of check of the particulate filter by the notification means when the exhaust temperature detection means detects a value not less than the reference temperature all reference time or more at least once, or when the exhaust differential pressure detection means calculates a value not less than the reference variation at least once.

According to the present invention, the control means is connected to a filter temperature detection means detecting a filter temperature of the particulate filter, and when the filter temperature detected by the filter temperature detection means is not less than a reference filter temperature, the control means does not start the internal combustion engine.

According to the present invention, when the control means has notified request of check of the particulate filter by the notification means for a reference period or more and the particulate filter is not checked, the control means restricts the output of the internal combustion engine until the particulate filter is checked.

Effect of the Invention

The present invention brings the following effects.

The present invention can prevent the driving of the internal combustion engine from being continued while the melt damage of the particulate filter exists.

Figure 1:
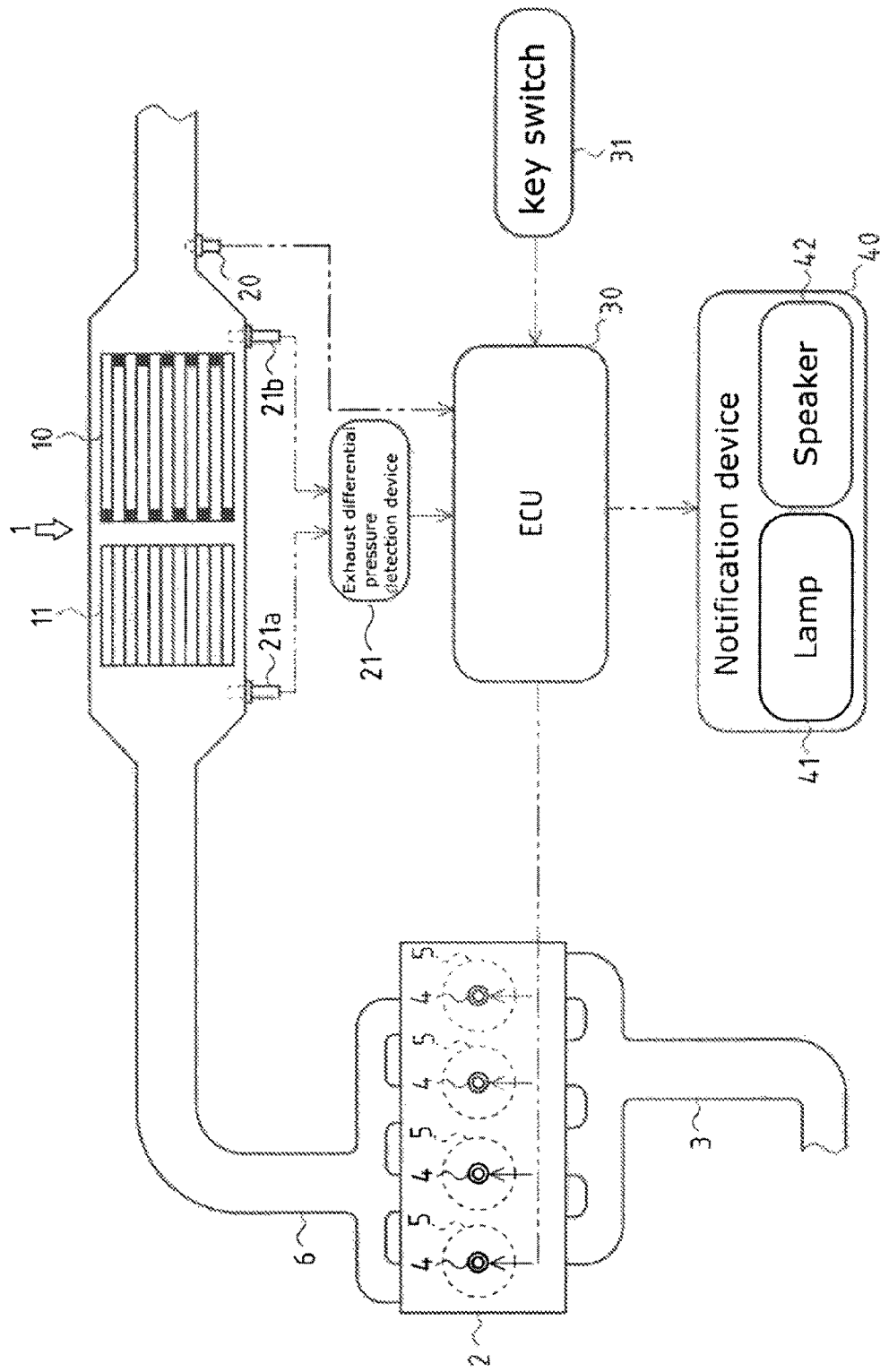
FIG. 1 It is a schematic drawing of an exhaust purification device for an internal combustion engine according to the present invention.

DESCRIPTION OF NOTATIONS 1 exhaust purification device for internal combustion engine
2 internal combustion engine
10 particulate filter
20a downstream-side temperature sensor
20b filter temperature sensor
21 exhaust differential pressure detection device
30 ECU
40 notification device T1 downstream-side exhaust temperature
T10 filter temperature
P(n−1) first exhaust differential pressure
P(n) second exhaust differential pressure
dP differential pressure variation
Ps reference variation
ts reference time
T1s reference exhaust temperature
T10s reference filter temperature

THE BEST MODE FOR CARRYING OUT THE INVENTION

Explanation will be given on an exhaust purification device 1 which is an embodiment of an exhaust purification device for an internal combustion engine according to the present invention.

As shown in FIG. 1, the exhaust purification device 1 purifies and discharges exhaust gas generated in an internal combustion engine 2. The exhaust purification device 1 is provided in the internal combustion engine 2 and includes a particulate filter 10, an oxidation catalyst 11, a downstream-side temperature sensor 20a which is an exhaust temperature detection means, a filter temperature sensor 20b which is a filter temperature detection means, an exhaust differential pressure detection device 21 which is an exhaust differential pressure detection means, an ECU 30 which is a control means, a notification device 40 which is a notification means, and the like.

The internal combustion engine 2 has one or more cylinders and exchanges energy generated by making fuel injected into the cylinders burn into rotational power. In the internal combustion engine 2, outside air supplied through an intake route 3 and fuel supplied through four fuel injection valves 4 are mixed and burn in four cylinders 5. Exhaust gas generated at this time is discharged through an exhaust route 6. The internal combustion engine 2 according to this embodiment is a straight four-cylindered engine, but the internal combustion engine according to the present invention is not limited thereto.

The particulate filter 10 removes particulate (carbonaceous soot, high-boiling carbon hydride components (SOF) and the like) in the exhaust gas. The particulate filter 10 is arranged in the exhaust route 6 of the internal combustion engine 2. Concretely, the particulate filter 10 has honeycomb structure constructed by a porous wall of ceramic or the like, and the exhaust gas is always discharged after passing through the porous wall. The particulate filter 10 collects the particulate in the exhaust gas when the exhaust gas passes through the porous wall. As a result, the particulate is removed from the exhaust gas.

The oxidation catalyst 11 oxidizes nitrogenous compounds. The oxidation catalyst 11 is disposed at the upstream side of the particulate filter 10 and promotes oxidizing removal of the particulate.

The downstream-side temperature sensor 20a which is the exhaust temperature detection means detects the temperature of the exhaust gas after passing through the particulate filter 10. The downstream-side temperature sensor 20a is arranged at a position at which a downstream-side exhaust temperature T1 of the exhaust gas after passing through the particulate filter 10 can be detected.

The filter temperature sensor 20b which is the filter temperature detection means detects a filter temperature T10 of the particulate filter 10. The filter temperature sensor 20b is arranged at a position at which the filter temperature T10 of the particulate filter 10 can be detected.

The exhaust differential pressure detection device 21 which is the exhaust differential pressure detection means detects a differential pressure of the exhaust gas passing through the particulate filter 10. The exhaust differential pressure detection device 21 includes an upstream-side pressure sensor 21a and a downstream-side pressure sensor 21b. The upstream-side pressure sensor 21a is disposed at the upstream side of the particulate filter and detects an upstream-side exhaust pressure p1 of the exhaust gas before passing through the particulate filter 10 every predetermined time. The upstream-side pressure sensor 21a must be only at the upstream side of the particulate filter 10 and may be at upstream or downstream side of the oxidation catalyst 11. The downstream-side pressure sensor 21b is disposed at the downstream side of the particulate filter 10 and detects a downstream-side exhaust pressure p2 of the exhaust gas after passing through the particulate filter 10 every predetermined time. The exhaust differential pressure detection device 21 calculates exhaust differential pressure P(n−1), P(n), P(n+1), . . . every predetermined time from the upstream-side exhaust pressure p1 and the downstream-side exhaust pressure p2.

The ECU 30 which is the control means controls the internal combustion engine 2 and controls regeneration of the particulate filter 10. Concretely, the ECU 30 obtains the state of the particulate filter 10 detected by the downstream-side temperature sensor 20a, the filter temperature sensor 20b and the exhaust differential pressure detection device 21. Then, based on the obtained state of the particulate filter 10, the ECU 30 regenerates the particulate filter 10 and controls the internal combustion engine 2 so as to prevent melt damage. The ECU 30 controls the internal combustion engine 2 and the like based on signals from an accelerator (not shown) and the like. Furthermore, the ECU 30 starts and stops the internal combustion engine 2 based on signals from a key switch 31. Concretely, the ECU 30 may be constructed by connecting a CPU, a ROM, a RAM, a HDD and the like through a bus, or may alternatively be a one-chip LSI or the like. Various programs and data for controlling the internal combustion engine 2 and the particulate filter 10 are stored in the ECU 30.

The notification device 40 which is the notification means performs notification based on the state of the particulate filter 10. When it is possible that the particulate filter 10 is melted and damaged, the notification device 40 notifies requests of stop of the internal combustion engine 2 and check of the particulate filter 10. The notification device 40 includes a lamp 41 which is a visual notification means or a speaker 42 which is an auditory notification means.

The lamp 41 performs notification based on the state of the particulate filter 10 by lighting. Concretely, the lamp 41 notifies request of stop of the internal combustion engine 2 by lighting and notifies request of check of the particulate filter 10 by turning on and off of lighting. The method of notification is not limited to this embodiment.

The speaker 42 performs notification based on the state of the particulate filter 10 to an operator by auditory information. Concretely, the speaker 42 requests of stop of the internal combustion engine 2 and check of the particulate filter 10 by voice. The method of notification is not limited to this embodiment.

The ECU 30 is connected to the fuel injection valves 4 and controls the injection amount of the fuel injection valves 4 so as to start and stop the internal combustion engine 2 and controls the output thereof.

The ECU 30 is connected to the downstream-side temperature sensor 20a and can obtain the downstream-side exhaust temperature T1 detected by the downstream-side temperature sensor 20a.

The ECU 30 is connected to the filter temperature sensor 20b and can obtain the filter temperature T10 detected by the filter temperature sensor 20b.

The ECU 30 is connected to the exhaust differential pressure detection device 21 and can obtain the differential pressure P(n) detected by the exhaust differential pressure detection device 21.

At the downstream-side exhaust temperature T1, the ECU 30 transforms the second differential pressure P(n) calculated by the exhaust differential pressure detection device 21 and the first differential pressure P(n−1) calculated by the exhaust differential pressure detection device 21a predetermined time before into a second transformation differential pressure TP(n) and a first transformation differential pressure TP(n−1) each of which is pressure of the exhaust gas discharged at a predetermined temperature and a predetermined flow rate. A differential pressure variation dP can be calculated which is the difference between the second transformation differential pressure TP(n) and the first transformation differential pressure TP(n−1).

At the downstream-side exhaust temperature T1, the ECU 30 transforms the first differential pressure P(n−1) calculated by the exhaust differential pressure detection device 21a predetermined time before into the first transformation differential pressure TP(n−1) which is the pressure of the exhaust gas discharged at the predetermined temperature and the predetermined flow rate. Similarly, at the downstream-side exhaust temperature T1, the ECU 30 transforms the second differential pressure P(n) calculated by the exhaust differential pressure detection device 21 into the second transformation differential pressure TP(n) which is the pressure of the exhaust gas discharged at the predetermined temperature and the predetermined flow rate. Accordingly, the ECU 30 can calculate the differential pressure variation dP which is the difference between the second transformation differential pressure TP(n) and the first transformation differential pressure TP(n−1).

The ECU 30 is connected to the notification device 40 and controls the notification device 40 so as to perform notification based on the state of the particulate filter 10.

The ECU 30 stores a reference exhaust temperature T1s of the reference temperature, a reference filter temperature T10s, a reference variation Ps, a reference time ts, a reference period h which are standards for judging whether the particulate filter 10 is melted and damaged or not, and a melt damage count N which is counted when a predetermined condition at which the particulate filter 10 is possible to be melted and damaged is satisfied. The ECU 30 also stores an output map M1 of the internal combustion engine 2 and an output restriction map M2 for restricting the output of the internal combustion engine 2.

Figure 2:
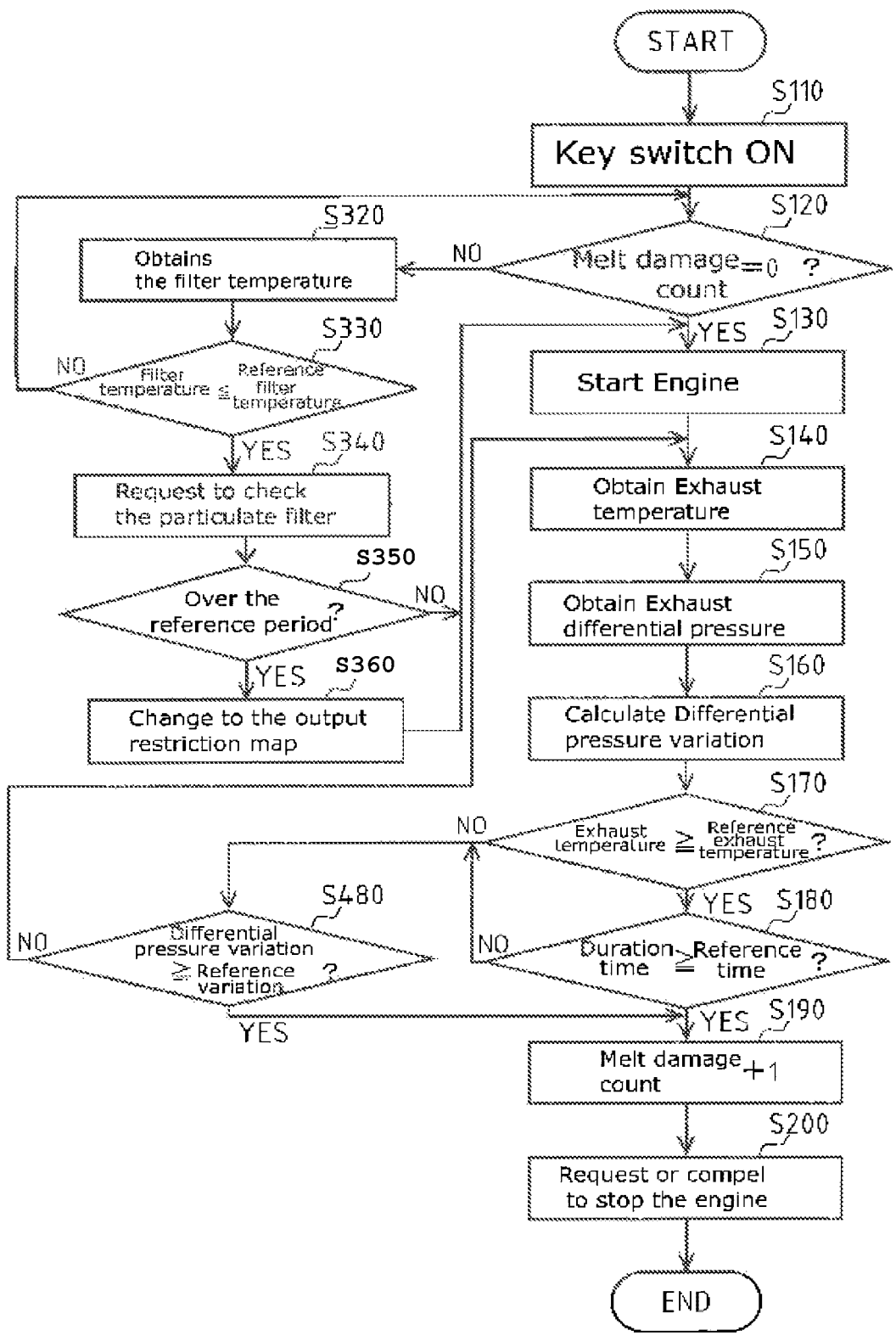
FIG. 2 It is a flow chart of melt damage preventing control of the exhaust purification device for the internal combustion engine according to an embodiment of the present invention.

Next, explanation will be given on control for preventing the melt damage of the particulate filter 10 by the ECU 30 of the exhaust purification device 1 according to the present invention referring to FIG. 2.

When the internal combustion engine 2 is started, the ECU 30 obtains the downstream-side exhaust temperature T1, the filter temperature T10 and the second differential pressure P(n), and calculates the differential pressure variation dP based on the first differential pressure P(n−1) calculated by the exhaust differential pressure detection device 21a predetermined time before. The ECU 30 judges whether the downstream-side exhaust temperature T1 and its duration time t or the differential pressure variation dP is not less than the corresponding reference value or not, that is, whether the possibility of melt damage of the particulate filter 10 exists or not. When the possibility of melt damage of the particulate filter 10 exists, the ECU 30 notifies the request of stop of the internal combustion engine by the notification device 40 or stops the internal combustion engine 2.

Explanation will be given on the control mode of the ECU 30 concretely.

At a step S110, the ECU 30 obtains a signal of starting the internal combustion engine 2 from the key switch 31, and then shifts the control stage to a step S120.

At the step S120, the ECU 30 judges whether the melt damage count N is 0 or not.

As a result, when N is zero, the control stage is shifted to a step S130.

When N is not zero, the control stage is shifted to a step S320.

At the step S130, the ECU 30 starts the driving of the internal combustion engine 2, and then shifts the control stage to a step S140.

At the step S140, the ECU 30 obtains the downstream-side exhaust temperature T1 by the downstream-side temperature sensor 20a, and then shifts the control stage to a step S150.

At the step S150, the ECU 30 obtains the second differential pressure P(n) calculated by the exhaust differential pressure detection device 21, and then shifts the control stage to a step S160.

At the step S160, the ECU 30 transforms the second differential pressure P(n) at the downstream-side exhaust temperature T1 and the first differential pressure P(n−1) calculated by the exhaust differential pressure detection device 21a predetermined time before into the second transformation differential pressure TP(n) and the first transformation differential pressure TP(n−1) each of which is the pressure of the exhaust gas discharged at the predetermined temperature and the predetermined flow rate. Subsequently, the ECU 30 calculates the differential pressure variation dP which is the difference between the second transformation differential pressure TP(n) and the first transformation differential pressure TP(n−1), and then shifts the control stage to a step S170.

At the step S170, the ECU 30 judges whether the downstream-side exhaust temperature T1 is not less than the reference exhaust temperature T1s or not.

As a result, when the downstream-side exhaust temperature T1 is judged to be not less than the reference exhaust temperature T1s, the control stage is shifted to a step S180.

When the downstream-side exhaust temperature T1 is judged to be less than the reference exhaust temperature T1s, the ECU 30 shifts the control stage to a step S480.

At the step S180, the ECU 30 judges whether the duration time t of the state in which the downstream-side exhaust temperature T1 is not less than the reference exhaust temperature T1s is not less than the reference time ts or not.

As a result, when the duration time t of the state in which the downstream-side exhaust temperature T1 is not less than the reference exhaust temperature T1s is judged to be not less than the reference time ts, the control stage is shifted to a step S190.

When the duration time t of the state in which the downstream-side exhaust temperature T1 is not less than the reference exhaust temperature T1s is judged to be less than the reference time ts, the ECU 30 shifts the control stage to the step S480.

At the step S190, the ECU 30 adds 1 to the melt damage count N, and then shifts the control stage to a step S200.

At the step S200, the ECU 30 notifies the request of stop of the driving of the internal combustion engine 2 by the notification device 40 or stops the driving of the internal combustion engine 2.

At the step S320, the ECU 30 obtains the filter temperature T10 from the filter temperature sensor 20b, and then shifts the control stage to a step S330.

At the step S330, the ECU 30 judges whether the filter temperature T10 is less than the reference filter temperature T10s or not.

As a result, when the filter temperature T10 is judged to be less than the reference filter temperature T10s, the control stage is shifted to a step S340.

When the filter temperature T10 is judged to be not less than the reference filter temperature T10s, the ECU 30 shifts the control stage to the step S120 again.

At the step S340, the ECU 30 notifies the request of check of the particulate filter 10 by the notification device 40, and then shifts the control stage to a step S350.

At the step S350, the ECU 30 judges whether the period for which the request of check of the particulate filter 10 is notified by the notification device 40 is not less than the reference period h or not.

As a result, when the period for which the request of check of the particulate filter 10 is notified by the notification device 40 is judged to be not less than the reference period h, the control stage is shifted to a step S360.

When the period for which the request of check of the particulate filter 10 is notified by the notification device 40 is judged to be less than the reference period h, the ECU 3u shifts the control stage to the step S130.

At the step S360, the ECU 30 replaces the output map M1 of the internal combustion engine 2 to the output restriction map M2 for restricting the output of the internal combustion engine 2, and then shifts the control stage to the step S130.

At the step S480, the ECU 30 judges whether the differential pressure variation dP is not less than the reference variation Ps or not.

As a result, when the differential pressure variation dP is judged to be not less than the reference variation Ps, the control stage is shifted to the step S190.

When the differential pressure variation dP is judged to be less than the reference variation Ps, the ECU 30 shifts the control stage to the step S140.

The duration time t of the state in which the downstream-side exhaust temperature T1 is not less than the reference exhaust temperature T1s is reset when the internal combustion engine 2 is stopped. The melt damage count N and the period for which the request of check of the particulate filter 10 is notified by the notification device 40 are reset when the particulate filter 10 is checked.

As mentioned above, the exhaust purification device 1 for the internal combustion engine 2 includes the particulate filter 10, the downstream-side temperature sensor 20a which is the exhaust temperature detection means detecting the downstream-side exhaust temperature T1 of the particulate filter 10, the exhaust differential pressure detection device 21 which is the exhaust differential pressure detection means calculating the differential pressure P(n) between the upstream-side exhaust pressure p1 of the particulate filter 10 and the downstream-side exhaust pressure p2 of the particulate filter 10 every predetermined time, the notification device 40 which is the notification means performing notification based on the state of the particulate filter 10, and the ECU 30 which is the control means controlling the internal combustion engine 2. The ECU 30 is connected to the downstream-side temperature sensor 20a, the exhaust differential pressure detection device 21 and the notification device 40, and calculates the differential pressure variation dP based on the first transformation differential pressure TP(n−1) to which the first differential pressure P(n−1) is exchanged with the predetermined condition and the second transformation differential pressure TP(n) to which the second differential pressure P(n) is exchanged with the predetermined condition. When the differential pressure variation dP is not less than the reference variation Ps, or when the downstream-side exhaust temperature T1 is not less than the reference exhaust temperature T1s for the reference time ts, the ECU 30 notifies the request of stop of the driving of the internal combustion engine 2 by the notification device 40 or stops the driving of the internal combustion engine 2.

When the downstream-side temperature sensor 20a detects the value not less than the reference exhaust temperature T1s for the time not less than the reference time ts at least once, or when the exhaust differential pressure detection device 21 calculates the value not less than the reference variation Ps at least once, the ECU 30 notifies the request of check of the particulate filter 10 by the notification device 40.

The ECU 30 is connected to the filter temperature sensor 20b which is the filter temperature detection means detecting the filter temperature T10 of the particulate filter 10, and when the filter temperature T10 detected by the filter temperature sensor 20b is not less than the reference filter temperature T10s, the ECU 30 does not start the internal combustion engine 2.

When the ECU 30 notifies the request of check of the particulate filter 10 by the notification device 40 for the reference period h and the particulate filter 10 is not checked, the ECU 30 restricts the output of the internal combustion engine 2 until the particulate filter 10 is checked.

According to the construction, the possibility of melt damage of the particulate filter 10 can be notified to an operator, or the internal combustion engine 2 can be stopped compulsorily. By restricting the output of the internal combustion engine 2, the check of the particulate filter 10 can be promoted. Accordingly, the driving of the internal combustion engine 2 is prevented from being continued in the state in which the particulate filter 10 is melted and damaged.

The invention claimed is:

1. An exhaust purification device for an internal combustion engine comprising:
   a particulate filter;
   an exhaust temperature detection means detecting a downstream-side exhaust temperature of the particulate filter;
   an exhaust differential pressure detection means calculating a differential pressure between an upstream-side exhaust pressure of the particulate filter and a downstream-side exhaust pressure of the particulate filter;
   a notification means performing notification based on the state of the particulate filter; and
   a control means controlling the internal combustion engine,
   characterized in that
   the control means is connected to the exhaust temperature detection means, the exhaust differential pressure detection means and the notification means, and
   the control means is programmed to calculate a differential pressure variation based on a first differential pressure detected at a predetermined time and a second differential pressure detected after the predetermined time, and when the differential pressure variation is not less than a reference variation, or when the downstream-side exhaust temperature is not less than a reference temperature for a reference time or longer, the control means is programmed to request a stop of the driving of the internal combustion engine by the notification means or stop the driving of the internal combustion engine.

2. The exhaust purification device for the internal combustion engine according to claim 1, wherein the control means is programmed to request a check of the particulate filter by the notification means when the exhaust temperature detection means detects a value not less than the reference temperature for the reference time or longer at least once, or when the exhaust differential pressure detection means calculates a value not less than the reference variation at least once.

3. The exhaust purification device for the internal combustion engine according to claim 2, wherein the control means is connected to a filter temperature detection means detecting a filter temperature of the particulate filter, and when the filter temperature detected by the filter temperature detection means is not less than a reference filter temperature, the control means is programmed to prohibit start of the internal combustion engine.

4. The exhaust purification device for the internal combustion engine according to claim 3, wherein when the control means has requested a check of the particulate filter by the notification means for a reference period or longer and the particulate filter is not checked, the control means is programmed to restrict the output of the internal combustion engine until the particulate filter is checked.

* * * * *